United States Patent [19]
Fischer

[11] Patent Number: 4,487,521
[45] Date of Patent: Dec. 11, 1984

[54] APPARATUS FOR SECURING EXPANDABLE PARTS TO SUPPORTING DEVICES

[75] Inventor: Klaus Fischer, Neustadt, Fed. Rep. of Germany

[73] Assignee: Klein, Schanzlin & Becker AG, Frankenthal, Fed. Rep. of Germany

[21] Appl. No.: 350,106

[22] Filed: Feb. 18, 1982

[30] Foreign Application Priority Data

Feb. 21, 1981 [DE] Fed. Rep. of Germany ....... 3106467

[51] Int. Cl.³ .............................................. F16D 1/00
[52] U.S. Cl. ......................................... 403/24; 403/28
[58] Field of Search .............................. 403/28, 30, 24

[56] References Cited
U.S. PATENT DOCUMENTS 1,332,946  3/1920  McCloud ............................. 403/28
4,074,946  2/1978  Swearingen ..................... 403/28 X

FOREIGN PATENT DOCUMENTS 2070736  9/1981  United Kingdom ................. 403/28

Primary Examiner—Andrew V. Kundrat
Attorney, Agent, or Firm—Peter K. Kontler

[57] ABSTRACT

The housing of a pump, compressor, heat exchanger or another part which is subjected to thermally and/or otherwise induced expansion and contraction has several spaced-apart legs or analogous portions movably secured to a base plate or the like so that the legs are movable along straight or arcuate paths intersecting each other at or close to a fixed reference point within or without the confines of the part. The base plate has discrete guides for the legs of the expandible and contractible part, and such guides are designed to allow the respective portions to move along the corresponding paths toward or away from the reference point, depending upon whether the part contracts or expands. The guides can be slotted or recessed, or they may constitute rotary components having eccentric sections extending into openings of the respective legs.

11 Claims, 6 Drawing Figures

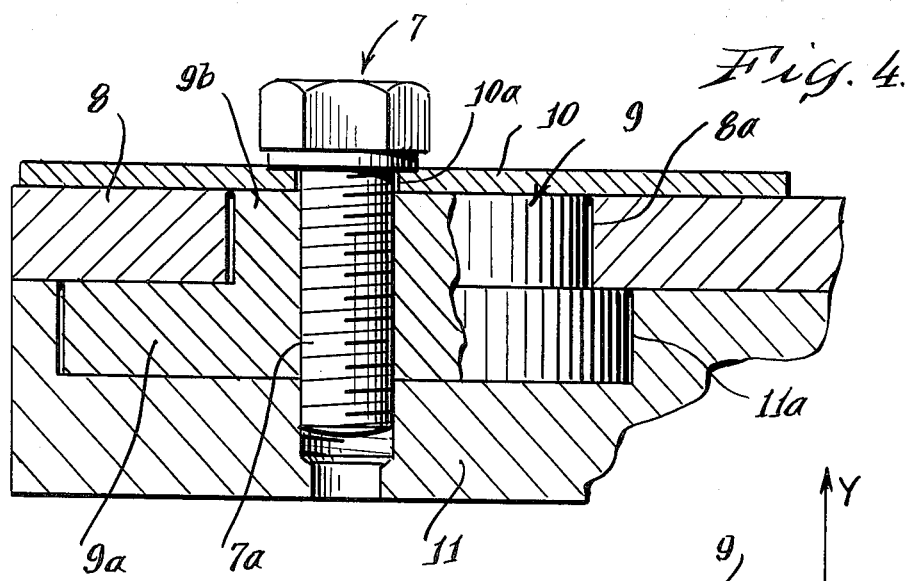
Fig. 4.
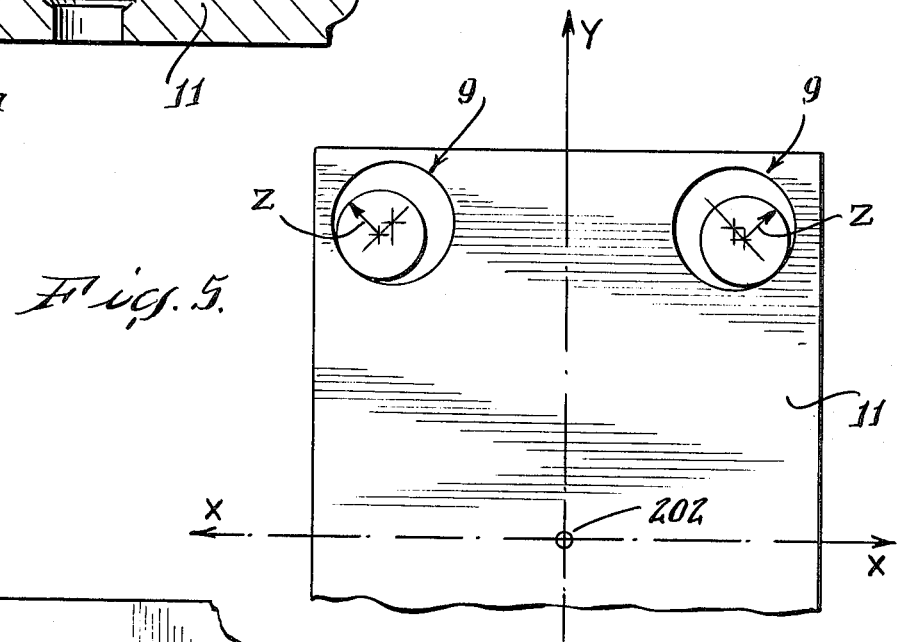
Fig. 5.
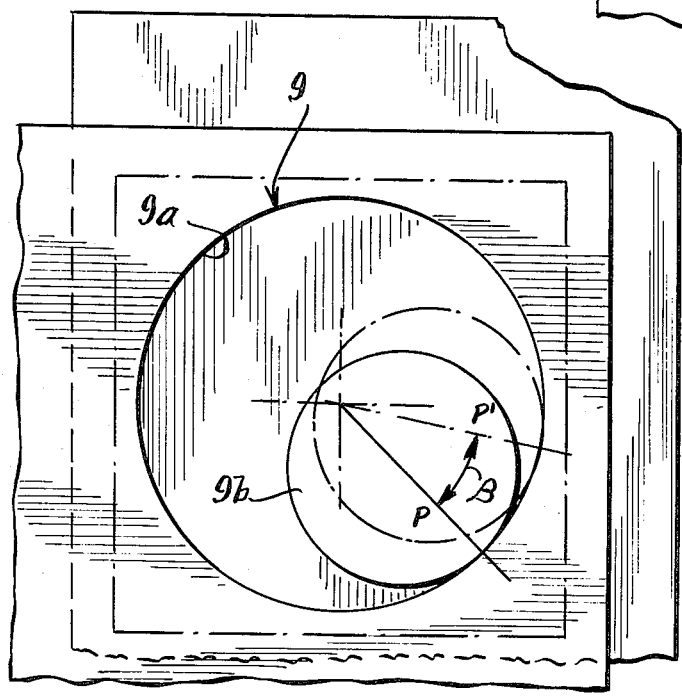
Fig. 6.
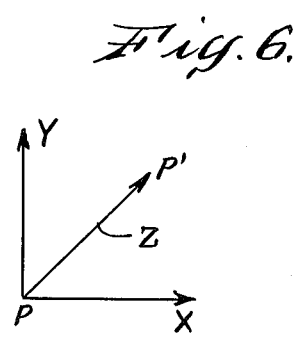

4,487,521

APPARATUS FOR SECURING EXPANDABLE PARTS TO SUPPORTING DEVICES

BACKGROUND OF THE INVENTION

The present invention relates to apparatus for supporting and/or holding parts which undergo expansion and contraction as a result of changes in temperature, pressure and/or other influences.

In many machines, aggregates, production lines and/or similar assemblies, numerous or certain parts (including, for example, boilers, heat exchangers, compressors, pumps, motors and/or others) undergo expansion or contraction under the action of changing temperatures and/or pressures. For example, the housing of a pump is likely to expand or contract in the axial direction as well as at right angles to such direction if the temperature and/or pressure of the fluid medium therein and/or therearound increases or decreases. In order to prevent excessive stressing of the material of expandible and contractible parts, they must be mounted in such a way that they can undergo repeated expansion and contraction without affecting their integrity, the integrity of their supports and/or the integrity of fasteners which secure the expandible and contractible parts to the supports. In other words, at least the majority of connections between an expandible and contractible part on the one hand and its support on the other hand must allow for a certain amount of play which is needed to prevent excessive stressing of such components. Furthermore, it is often necessary that the position of an expandible and contractible part with reference to another part of the same aggregate, assembly, machine or production line remain unchanged so as to ensure that such parts will be capable of continuous cooperation irrespective of changes in the dimensions of the expandible and contractible part. By way of example, the connection between the shaft of a centrifugal pump and the shaft of the motor which drives the pump shaft should remain unaffected by expansion and/or contraction of the pump housing.

Commonly owned German Pat. No. 1,027,515 discloses a system for mounting the housing of a pump, turbine or the like. The connection between the housing and its support (e.g., a base plate) is such that the housing can undergo axial expansion or contraction. To this end, the housing is provided with projections received in and movable lengthwise of suitable guides which extend in parallelism with the axis of the housing. The patented system is capable of preventing misorientation of the pump shaft because the housing is expandible and contractible in the longitudinal direction of the aforementioned guides which are parallel to the pump shaft. Furthermore, the legs of the housing are secured to the base plate by means of bolts which are designed in such a way that they allow for changes in the level of each leg as well as for movements of each leg in a plane which is parallel to the base plate. In other words, each of the legs is mounted with a certain amount of clearance so that it can move in several directions in response to expansion or contraction of its material and/or in response to expansion or contraction of the major part of the housing in the axial direction of the pump shaft. A drawback of the patented arrangement is that the expandible and contractible part is not guided and held with a requisite degree of accuracy and reproducibility, not only relative to the support but also relative to the component or components which cooperate therewith.

OBJECTS AND SUMMARY OF THE INVENTION

An object of the invention is to provide a novel and improved apparatus for movably coupling a base plate or the like with a part which is subject to thermally induced and/or pressure-induced and/or otherwise initiated expansion or contraction.

Another object of the invention is to provide a novel combination of a thermally or otherwise expandible and contractible first part with a supporting or holding second part which ensures that neither of the two parts is subjected to excessive stresses as a result of expansion or contraction of the first part.

A further object of the invention is to provide a very simple and inexpensive mode of securing the first part to the second part in such a way that the first part can readily expand or contract relative to the second part but its position is accurately predictable for each and every stage of expansion or contraction.

An additional object of the invention is to provide a combination of the above outlined character which allows for predictable and controlled expansion or contraction of the first part relative to the second part and in relation to a fixed reference point whose position or location can be selected practically at will, for example, to coincide with the preferably fixed location of the coupling between the shafts of a centrifugal pump and a motor therefor if the first part is the housing of the centrifugal pump or the housing of the motor.

Still another object of the invention is to provide a novel combination of parts which can be installed in existing plants employing components that are subject to expansion or contraction under the action of changing pressure and/or variations in ambient temperature.

An additional object of the invention is to provide novel and improved guide means for the legs or otherwise configured portions of expandible and contractible housings, casings, boxes, shells or otherwise configurated parts which are subject to changing pressures, temperatures and/or other influences which cause expansion and contraction.

The invention resides in the provision of a combination including a first part which is subject to expansion and contraction and resultant shifting relative to a fixed reference point (such reference point can be located within or without the confines of the first part) and which has at least three spaced-apart portions (e.g., the legs of the housing of a centrifugal pump, compressor, heat exchanger or the like) movable relative to the reference point along mutually inclined (straight or arcuate) paths intersecting each other at or at least close to the reference point, and a second part (e.g., a stationary base plate) constituting a support, carrier or holder for the first part and including guide means for the aforementioned spaced-apart portions of the first part. The guide means serves to permit the spaced-apart portions of the first part to move along the respective paths. It is preferred to provide a discrete stationary or mobile guide for each portion of the first part. The discrete guides can remain in engagement with the respective portions of the first part in all conditions of expansion or contraction of the first part. For example, the guide means can comprise a female guide for each of the spaced-apart portions, and such portions may constitute studs, bolts or otherwise configured projections which extend into the respective female guides (alternatively, the spaced-apart portions of the first part may be slotted, recessed or otherwise configurated female portions for reception of discrete male guides of the guide means).

If the guide means includes mobile guides for the spaced-apart portions of the first part, such guides can constitute rotary components which are turnable about discrete parallel or mutually inclined axes and include eccentric sections cooperating with the respective portions of the first part (e.g., the eccentric sections can extend into circular openings of the respective portions of the first part).

The novel features which are considered as characteristic of the invention are set forth in particular in the appended claims. The improved apparatus or combination itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 4 is a sectional view as seen in the direction of arrows from the line IV—IV of FIG. 3;

FIG. 5 is a fragmentary smaller-scale plan view of the support shown in FIG. 3 with two fastening facilities for the expandible an contractible part; and FIG. 6 is a plan view of the right-hand corner portion of the support shown in FIG. 5.

DESCRIPTION OF THE PREFERRED EMBODIMENTS

Figure 1:
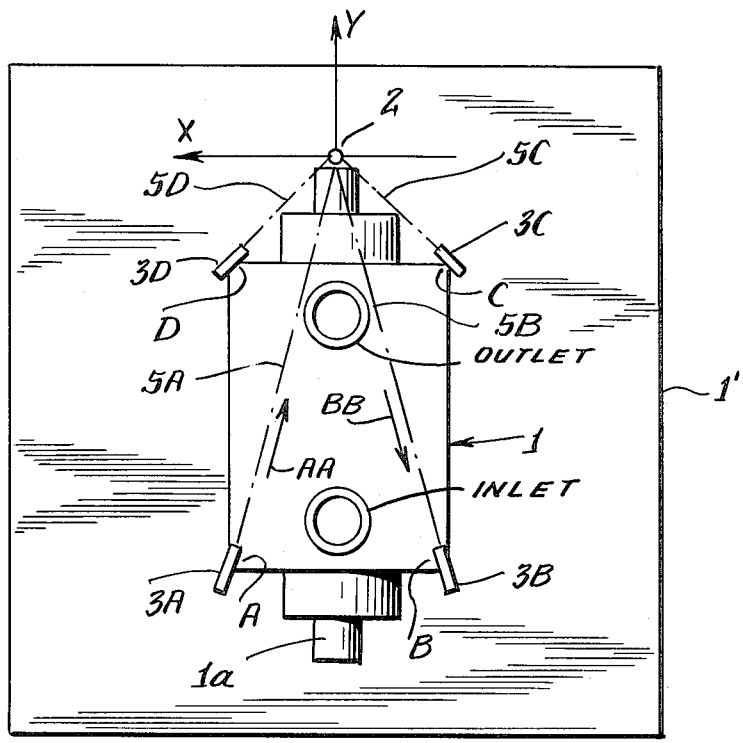
FIG. 1 is a schematic plan view of a pump housing showing the manner in which four spaced-apart portions of the housing are movably secured to a support.

Referring first to FIG. 1, there is shown a first part constituting the housing or body 1 of a pump (e.g., a centrifugal pump). The housing 1 consists of an isotropic material whose characteristics are not affected by temperature changes. The fixed or reference point 2 is located on an extension of the axis of the housing 1, for example, in the region where the pump shaft 1a is coupled to the shaft of the motor, not shown. In other words, it is assumed that the coupling between the pump shaft 1a and the output element of the motor is held against movement in the axial direction of the housing 1. Therefore, when the housing 1 expands or contracts uniformly in response to changes in the temperature or pressure of conveyed fluid or the surrounding atmosphere, the four corner portions A, B, C and D of the pump housing 1 move in directions and along paths which are indicated by broken lines, as at 5A, 5B, 5C and 5D. These broken lines are resultants of vectors which make angles of 90 degrees and are parallel to the abscissa and ordinates of a coordinate system whose zero point is located at 2. The portions A, B, C and D of the housing 1 move along stationary guides 3A, 3B, 3C, 3D which are parallel to the respective paths 5A, 5B, 5C and 5D. When the housing 1 contracts, the portions A to D move upwardly and inwardly, as viewed in the drawing (note the arrow AA for the portion A). If the housing 1 expands, the portions A to D move downwardly and outwardly, as viewed in FIG. 1 (note the arrow BB for the portion B). The housing 1 is assumed to be uniformly heated (e.g., by the conveyed fluid) so that all of its portions expand or contract at the same rate. For example, the portions A to D can be provided with bolts or projections which are slidable in grooves provided in the respective guides 3A to 3D and extending in parallelism with the respective broken lines 5A to 5D. The guides 3A–3D can be provided on or can constitute portions of a second part 1', e.g., a stationary base plate for the housing 1.

The invention is based on the recognition that the paths along which the various portions of the part 1 move in response to expansion or contraction of the part 1 intersect each other at or close to the fixed point 2 whose position is independent of the positions of portions A to D of the part 1. The directions in which the paths denoted by the broken lines 5A to 5D extend can be readily ascertained, especially if the heat expansion coefficient of the material of the part 1 is constant and if the entire part 1 is heated, cooled, compressed or decompressed at a uniform rate. This is the case when the part 1 constitutes a uniformly cooled or heated housing or a uniformly pressurized or decompressed vessel. When such a part expands or contracts, the portions A to D move in the directions of resultants or sums of the vectors X and Y. The magnitude of such resultants is determined by expansion or contraction in the directions indicated by the arrows X and Y, i.e., by the extent of movement of portions A to D in the directions indicated by such arrows. As mentioned above, the fixed point 2 can be located within or without the confines of the part 1. The guide for each of the portions A to D should be designed in such a way that it allows for movements of the respective portion (e.g., the portion A) along the corresponding path (5A) independently of movement of other portions (B, C and D) along their paths (5B, 5C and 5D).

Figure 2:
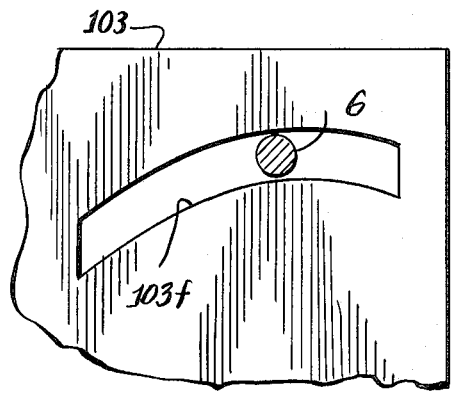
FIG. 2 is a schematic plan view of a portion of a modified support and of a portion of the part which is movably secured to the support so that it can undergo thermally induced and/or pressure-induced and/or otherwise initiated expansion or contraction.

FIG. 2 shows a portion 6 of a pump housing which is a pin, stud or an analogous projection and extends into an arcuate groove or slot 103f of a guide 103. The groove or slot 103f is arcuate because the housing which includes the projection 6 (and at least two additional projections) is assumed to be subjected to several influences, such as varying temperatures and varying pressures. If the part which is mounted or secured in accordance with the present invention is subjected to the action of several variable influences, the configuration of the groove or slot 103f (i.e., of that portion of the respective guide 103 which controls or determines the direction of movement of the associated projection 6 in response to expansion or contraction of the part) must match the more complex resultant of vectors denoting the expansion and contraction of the corresponding portion of the part in the directions of the abscissa and ordinate of the coordinate system whose zero point is located at the fixed reference point for the part. Such reference point can be located within the confines of the part to be secured or externally of such confines (note FIG. 1). The shape of the groove or slot 103f shown in FIG. 2 can be calculated or determined by experimentation. It goes without saying that the groove or slot 103f can be replaced with a ridge or rail for a complementary female follower then replacing the projection 6.

The projection 6 may extend into the slot or groove 103f of FIG. 2 with a certain amount of clearance.

If the grooved guide 103 is replaced with a male guide in the form of a rail or track, the projection 6 can be replaced with a female portion which cooperates with and is movable along the male guide. This would merely amount to a reversal of the mode of engagement between the components 103 and 6 shown in FIG. 2.

The paths for at least two projections of the part including the projection 6 intersect each other at or very close to the fixed reference point.

FIGS. 3 to 6 illustrate a further mode of securing the portions or legs 8 of a pump housing (first part) to a base plate 11 (second part) or an analogous support for the housing. The base plate 11 has a circular socket or recess 11a for each of the legs 8, and each such socket receives the larger-diameter section 9a of a mobile disc-shaped guide 9. The smaller-diameter section 9b of each guide 9 is eccentric with reference to the larger-diameter section 9a and is received in a circular opening or through hole 8a of the respective leg 8. The smaller-diameter section 9b of each guide 9 is overlapped by a square or otherwise configurated cover plate 10 having an aperture 10a for the shank 7a of a bolt 7 which meshes with the base plate 11 and holds the cover plate 10 and hence the leg 8 against movement upwardly and away from the base plate 11, as viewed in FIG. 4.

FIG. 5 shows substantially one-half of the base plate 11 and two of the three or more guides 9. At least one additional guide 9 is provided for the additional leg or legs 8 of the housing. In other words, the number of points at which the part that undergoes relatively simple or more complex expansion and contraction in response to changes in temperature and/or pressure contacts or is supported by the base plate 11 exceeds two and can exceed three, four or more.

Figure 3:
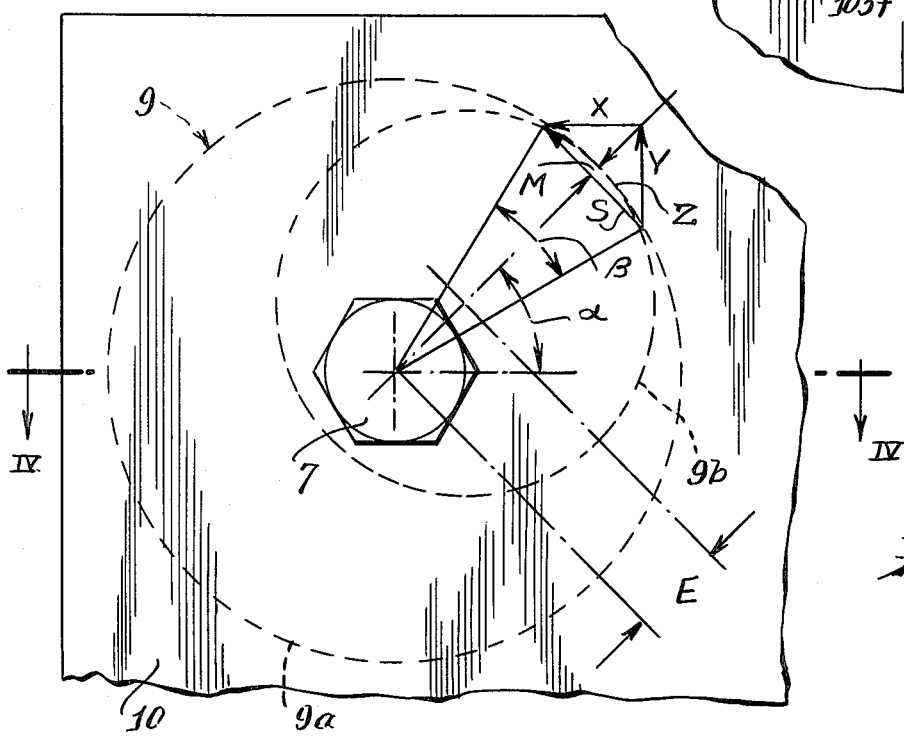
FIG. 3 is a diagrammatic plan view of a third support for an expandible and contractible part.

FIG. 3 shows that, when the pump housing expands in the directions indicated by arrows X and Y, namely, in the directions of the abscissa and ordinate of a coordinate system (e.g., in response to heating of the pump housing), the leg (not shown) below the cover plate 10 of FIG. 3 moves in the direction of resultant Z (from the point P to the point P' of FIG. 6). Since the leg 8 surrounds the smaller-diameter section 9b of the respective guide 9, the larger-diameter section 9a of such guide turns about the axis of the respective bolt 7. FIG. 6 shows that the smaller-diameter section 9b of the guide 9 turns through an angle beta and along the path denoted by the resultant Z. When the angle beta is relatively small, the path denoted by Z is straight or substantially straight, i.e., such path coincides with the hypotenuse of a triangle whose sides are shown at X and Y (FIG. 3).

The bolts 7 merely serve as means for preventing uncontrolled shifting of the respective legs 8 but they cannot prevent the aforediscussed movements of the legs in response to expansion or contraction of the pump housing.

The eccentricity E of the section 9b with reference to the section 9a of each guide 9 and the angle alpha shown in FIG. 3 must be selected in dependency on the ratio of Y to X. Such ratio can be readily ascertained (calculated or determined by experimentation) on the basis of known conditions prevailing in the plant where the expandable part (such as the aforementioned pump housing including the legs 8) is put to use.

In many instances, the changes in dimensions of the part to be secured to the base plate 11 are relatively minor; therefore, the arcuate paths denoted at Z are nearly straight. The guides 9 merely turn about the axes of the respective bolts 7. The extent of shifting of the expandible part along the respective guides (the discs 9 of FIGS. 3 to 6 are or can be said to constitute functional equivalents of the guides 3A to 3D shown in FIG. 1) depends on the dimensions of such part, on the difference between the maximum and minimum temperatures influencing the part and/or on the difference between the maximum and minimum pressures acting upon the part. The provision of disc-shaped guides 9 in lieu of straight or substantially straight guides is permissible or possible because the anticipated shifting of points where the part (such as the housing including the legs 8) is movably secured to the base plate 11 is relatively small. Thus, when the eccentricity E of the section 9b relative to the respective section 9a is rather pronounced, the arcuate path Z shown in FIG. 3 can be replaced by a straight chord-like path S. This is due to the fact that the angle beta is then relatively small so that the deviation of the arcuate path Z from the path S is negligible. The maximum deviation between Z and S is indicated at M. By changing the angle alpha, one can vary the ratio of expansions in the directions indicated by arrows X and Y.

The illustrated arrangements can be used with advantage to movably secure parts which are subjected to uniform expanding or contracting forces and whose expansion coefficient is constant.

The fixed reference point 202 in FIG. 5 representing the intersection of the paths denoted by the arrows Z is located within the confines of the part including the legs 8. The eccentric sections 9b of the guides 9 can be replaced with levers or arms without departing from the spirit of the invention. All that counts is to ensure that the legs 8 have freedom of movement along paths which have components of movement in the directions indicated by the arrows X and Y. As mentioned above, the provision of arcuate paths which deviate only slightly or negligibly from straight paths is acceptable because the extent of expansion or contraction, and hence the extent of movement of the legs 8 in the directions indicated by arrows Z, is relatively small. In other words, the movements of the legs 8 approximate the ideal movements without causing the generation of excessive internal stresses which could result in damage to the expandible and contractible part, to the support therefor and/or to the means for guiding selected portions of the expandible and contractible part relative to the support.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. The combination of a first part which is subject to expansion and contraction and resultant shifting relative to a fixed reference point and has at least three spaced-apart portions movable relative to said reference point along mutually inclined paths intersecting each other at least close to said reference point; and a second part including guide means for said portions, said guide means being arranged to permit said portions of said first part to move along the respective paths.

2. The combination of claim 1, wherein said guide means includes a discrete guide for each of said portions of said first part.

3. The combination of claim 1, wherein said fixed reference point is located without the confines of said first part.

4. The combination of claim 1, wherein said first part includes a pump housing.

5. The combination of claim 1, wherein at least one of said paths is an at least substantially straight path.

6. The combination of claim 1, wherein at least one of said paths is an at least slightly arcuate path.

7. The combination of claim 1, wherein said guide means includes a discrete guide for each of said portions and said discrete guides are in engagement with the respective portions in all conditions of expansion and contraction of said first part.

8. The combination of claim 1, wherein said guide means comprises a female guide for each of said portions and said portions extend into the respective female guides.

9. The combination of claim 1, wherein said guide means includes a mobile guide for each of said portions.

10. The combination of claim 9, wherein said mobile guides are turnable about discrete axes and include eccentric sections cooperating with the respective portions of said first part.

11. The combination of claim 9, wherein said second part includes a base plate for said first part.

* * * * *